US009684677B2

(12) United States Patent
LaBerge

(10) Patent No.: US 9,684,677 B2
(45) Date of Patent: *Jun. 20, 2017

(54) METHOD FOR RELIABLE AND EFFICIENT FILESYSTEM METADATA CONVERSION

(71) Applicant: Quantum Corporation, San Jose, CA (US)

(72) Inventor: Tim LaBerge, St. Paul, MN (US)

(73) Assignee: Quantum Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/971,368

(22) Filed: Aug. 20, 2013

(65) Prior Publication Data

US 2013/0339401 A1 Dec. 19, 2013

Related U.S. Application Data

(63) Continuation of application No. 12/497,495, filed on Jul. 2, 2009, now Pat. No. 8,190,655, and a continuation of application No. 13/363,208, filed on Jan. 31, 2012, now Pat. No. 8,577,939.

(51) Int. Cl.
G06F 17/30 (2006.01)

(52) U.S. Cl.
CPC .. *G06F 17/30292* (2013.01); *G06F 17/30076* (2013.01)

(58) Field of Classification Search
CPC .......... G06F 17/3012; G06F 17/30123; G06F 17/30569; G06F 17/30292; G06F 17/30076

USPC ........ 700/820, 821, 700; 707/820, 821, 700; 707/999.002
See application file for complete search history.

(56) References Cited

U.S. PATENT DOCUMENTS

| | | | |
|---|---|---|---|
| 4,611,272 A * | 9/1986 | Lomet | |
| 7,506,111 B1 * | 3/2009 | Hamilton | 711/156 |
| 7,743,038 B1 * | 6/2010 | Goldick | 707/694 |
| 7,752,226 B1 * | 7/2010 | Harmer et al. | 707/796 |
| 8,046,333 B1 * | 10/2011 | Wang et al. | 707/646 |
| 8,117,244 B2 * | 2/2012 | Marinov et al. | 707/827 |
| 2002/0065810 A1 * | 5/2002 | Bradley | 707/2 |
| 2002/0083037 A1 * | 6/2002 | Lewis et al. | 707/1 |
| 2005/0192974 A1 * | 9/2005 | DeLorme et al. | 707/100 |
| 2006/0101036 A1 * | 5/2006 | Kawabe et al. | 707/100 |
| 2006/0112151 A1 * | 5/2006 | Manley et al. | 707/201 |
| 2006/0277225 A1 * | 12/2006 | Mark et al. | 707/201 |
| 2007/0255921 A1 * | 11/2007 | Gole et al. | 711/170 |
| 2008/0040388 A1 * | 2/2008 | Petri et al. | 707/104.1 |
| 2008/0189342 A1 * | 8/2008 | Bhattacharya et al. | 707/205 |

(Continued)

*Primary Examiner* — Mohammed R Uddin
(74) *Attorney, Agent, or Firm* — Roeder & Broder LLP; James P. Broder

(57) ABSTRACT

A method for converting metadata in a hierarchical configuration within a filesystem from a first format to a second format includes reading metadata in the first format within the hierarchical configuration; writing the metadata from the hierarchical configuration into a flat file; and writing the metadata back into the hierarchical configuration, the metadata being in the second format. The method can also include increasing the size of each of a first inode and a second inode within a first inode chunk in the filesystem, assigning the first inode to the first inode chunk, and assigning the second inode to a second inode chunk.

13 Claims, 3 Drawing Sheets

(56) References Cited

U.S. PATENT DOCUMENTS

2009/0043978 A1* 2/2009 Sawdon et al. ............... 711/162
2009/0276593 A1* 11/2009 Jacobson et al. ............. 711/162

* cited by examiner

M1, M2, M3, M4, M5, M6, M7, M8, M9, M10, M11, M12, M13, M14, M15,...,M27

METHOD FOR RELIABLE AND EFFICIENT FILESYSTEM METADATA CONVERSION

RELATED APPLICATIONS

The present application is a continuation application and claims the benefit under 35 U.S.C. 120 on co-pending U.S. patent application Ser. No. 13/363,208, filed on Jan. 31, 2012. Additionally, U.S. patent application Ser. No. 13/363,208 is a continuation application that claims the benefit under 35 U.S.C. 120 on U.S. patent application Ser. No. 12/497,495, filed on Jul. 2, 2009, which is now U.S. Pat. No. 8,190,655 B2, issued on May 29, 2012. To the extent permitted, the contents of U.S. patent application Ser. No. 13/363,208 and U.S. Pat. No. 8,190,655 B2 are incorporated herein by reference.

BACKGROUND

Metadata can generally be referred to as data that describes other data. More specifically, filesystem metadata may include descriptive information about the context, quality, condition, and characteristics of data within a filesystem. A filesystem typically includes a hierarchy of directories (or a directory tree) that is used to organize files on a computer. For example, within some filesystems, an item of metadata may describe an individual data point or content item, or an item of metadata may describe a file or collection of data, wherein the file or collection of data may include a hierarchical structure which defines the relationship between different data points within the file. In particular, metadata may include information such as the name or title, size, length, ownership, location, etc. for any data point or collection of data.

Within many filesystems, the metadata that describes the various files and/or directories in the filesystem is stored in a data structure or a series of data structures called inodes. Each inode, which is assigned a unique inode number within that filesystem, is designed to store up to a certain amount of information or metadata about the file. Further, an "inode chunk" is a collection of a certain number of inodes stored contiguously on disk. Additionally, the size of the inodes is typically set when the filesystem is created.

Over time, new features may be implemented in the filesystem software. These features may require changes or additions to the metadata contained in the filesystem's inodes. Eventually, as more additions or changes are made, there may be no space left in the inode to support desired new functionality. Therefore, in such situations, there is a need to convert metadata contained in the inodes from the existing format to another format.

Previous attempts to convert metadata have resulted in the process being unreasonably time consuming, thereby causing excessive downtime of the filesystem, or, more importantly, an inadequate uptime of the filesystem. Additionally, the integrity of the metadata may be at risk due to the possibility of failure during the conversion process.

When converting a filesystem with hundreds of gigabytes of metadata, efficiency and reliability are of the upmost importance. Filesystems can contain hundreds of millions of inodes consuming hundreds of gigabytes of disk space. Metadata storage can typically perform at most a few hundred input/output (I/O) operations per second, so the time to rapidly convert a large filesystem can become unreasonable. Since metadata objects tend to be relatively small and generally not contiguous on disk, an efficient scheme for converting metadata cannot rely on reading items one by one from disk and chasing associating structures.

Another aspect of efficiency is the amount of storage required. The conversion process should not require disproportionate amounts of new storage nor render existing storage unusable due to fragmentation.

Clearly, reliability in any metadata conversion process is also important. A filesystem with hundreds of millions of files has great value to the user. Large filesystems take longer to convert, and the greater the conversion time, the greater the risk for failure during the conversion process. Accordingly, any viable scheme for converting metadata must allow for recovery from any failures, for example, process and/or node failures, during the conversion.

SUMMARY

The present invention is directed to a method for converting metadata in a hierarchical configuration within a filesystem from a first format to a second format. In certain embodiments, the method comprises the steps of: reading metadata that is in the first format within the hierarchical configuration; writing the metadata from the hierarchical configuration into a flat file; and writing the metadata back into the hierarchical configuration, the metadata being in the second format.

In one embodiment, the method further comprises the steps of scanning the metadata to compile a list of inode chunks and sorting the list of inode chunks based on their location within the filesystem.

Additionally, in some embodiments, the method further comprises the steps of increasing the size of each of a first inode and a second inode within a first inode chunk in the filesystem, assigning the first mode to the first mode chunk, and assigning the second mode to a second inode chunk. In one such embodiment, the first inode includes an original first inode number and the second inode includes an original second inode number. Moreover, in one embodiment, the method further comprises the steps of retaining the original first inode number for the first inode and assigning a new second inode number for the second inode.

Further, in one embodiment, the method further comprises the step of writing the first inode chunk and the second inode chunk from the hierarchical configuration to the flat file. In such embodiment, the method further comprises the step of writing the first inode chunk and the second inode chunk from the flat file back into the hierarchical configuration.

In some embodiments, the method further comprises the steps of (i) writing a plurality of directory extents from a first location within the filesystem to a second location, each directory extent identifying a location and a length of a contiguous range of directory blocks, and (ii) generating an arranged directory extent list so that the contiguous ranges of directory blocks are listed in substantially the same order as the directory extents were listed at the first location within the filesystem. In one such embodiment, the method further comprises the step of writing the arranged directory extent list from the hierarchical configuration into the flat file. Moreover, in such embodiment, the method further comprises the step of writing the arranged directory extent list from the flat file back into the hierarchical configuration.

Additionally, the present invention is further directed to a filesystem comprising a file and metadata that describes the file. In one embodiment, the filesystem is adapted to convert the metadata from a first format to a second format utilizing the method as described above.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

As an overview, the present invention describes a method for converting metadata of a filesystem from a first format to a second format. One example of such a conversion can include increasing the capacity of each of the storage blocks, e.g., inodes, of the metadata. The methods disclosed herein can provide substantially improved efficiency in the amount of time required to fully convert the metadata from the first format (original capacity) to the second format (increased capacity) and/or in the amount of storage space required to complete the metadata conversion. Additionally or alternatively, the methods disclosed herein can provide substantially improved reliability, so that there can be a much greater likelihood that the metadata does not get lost, damaged, or otherwise compromised during the conversion process.

The methods described in detail herein can be utilized with similar success for a variety of different filesystems. In one non-exclusive example, one or more of the methods provided herein can be used with a hierarchical configuration within a filesystem that scales to hundreds of millions of files, hundreds of gigabytes of metadata, and petabytes of user data. However, the methods described herein are equally applicable to other types and sizes of filesystems.

Figure 1:
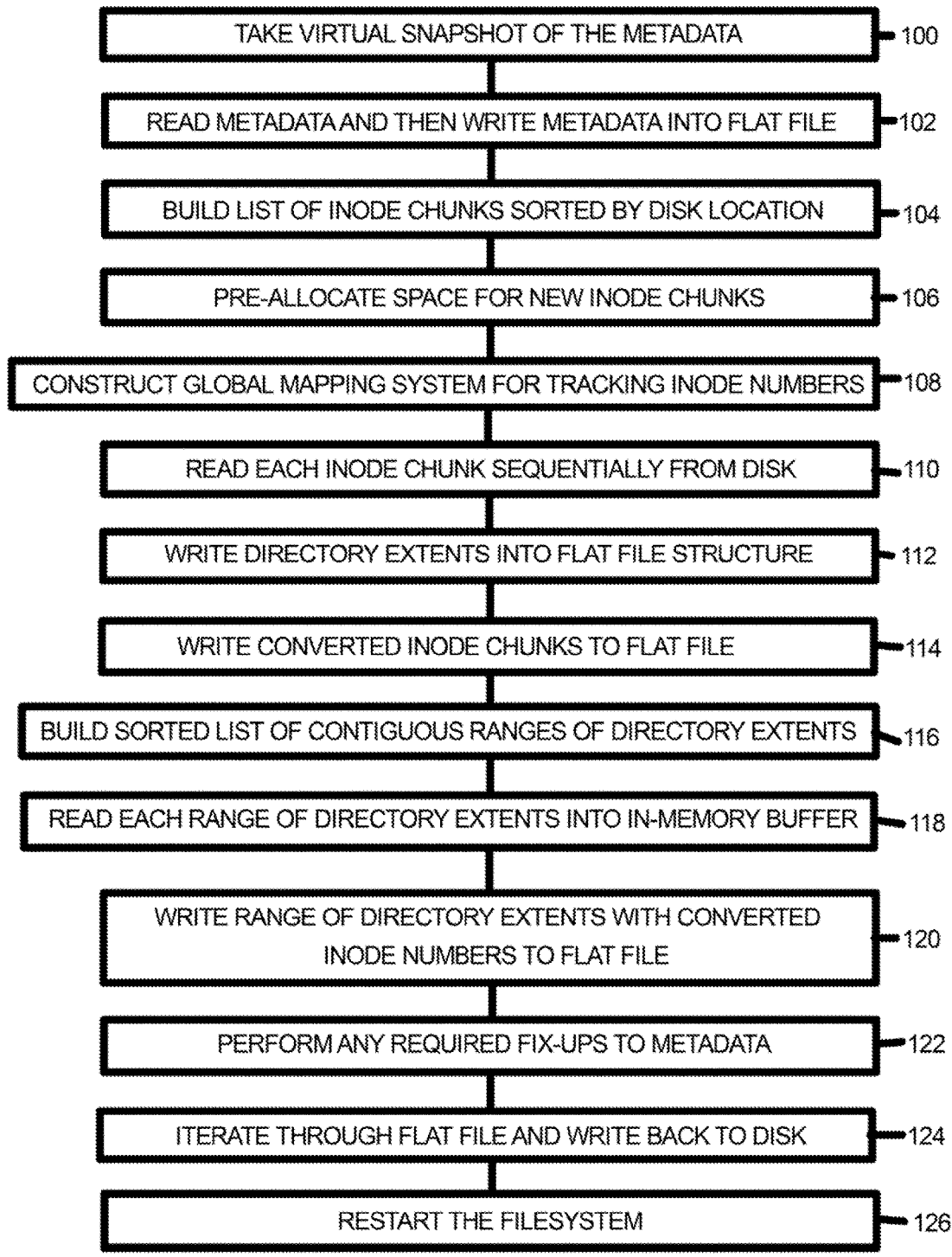
FIG. 1 is a simplified flow chart illustrating one embodiment of a method for converting metadata of a filesystem from a first format to a second format according to the present invention.

FIG. 1 is a simplified flow chart illustrating one embodiment of a method for converting metadata of a filesystem from a first format to a second format utilizing the teachings as described in the present invention. As utilized herein, metadata can include several different forms of data. For example, in one embodiment, metadata can include one or more inodes, one or more directory extents, one or more superblocks, one or more allocation bitmaps, etc. in alternative embodiments, metadata can include additional forms and/or can be found in different locations within the filesystem.

Additionally, in the embodiment described herein, the filesystem includes a plurality of inodes that are allocated in contiguous 512 KB mode chunks. In this embodiment, each mode can have an initial storage capacity of 512 bytes and each mode chunk initially contains 1,024 inodes. Each mode can be associated with one or more levels within the filesystem. For example, in a hierarchical configuration within a filesystem, inodes can be associated with one or more directories, one or more subdirectories, one or more files, etc. In alternative embodiments, the filesystem can include inodes that have an initial storage capacity of greater than or less than 512 bytes, can include mode chunks that have a storage capacity of greater than or less than 512 KB, and/or can include mode chunks that initially encompass greater than or less than 1024 inodes. It is recognized that the foregoing embodiment is provided as one representative example for ease of understanding, and is not intended to limit the scope of the invention in any manner.

Further, within the filesystem, each inode includes an inode number that is embedded in various locations throughout the metadata. The inode number can encode the physical location of the inode on disk. As utilized herein, disk is the storage medium being utilized for storing the contents of the filesystem, although other types of storage media for storing the contents of the filesystem can be equally be used, including tape, virtual tape, optical disk, etc. In some embodiments, the inode number includes both the number of the inode chunk (which can be numbered "1" through however many inode chunks are present within the filesystem), and the number of the inode within that inode chunk (which would typically be numbered as "1" through "1024" for the unconverted filesystem where there are 1,024 inodes within each inode chunk). By way of example, in one embodiment, if a particular inode was inode number 237 within inode chunk 1, then the full inode number would be 1,0237. In another example, if a particular inode was inode number 749 within inode chunk 6, then the full inode number would be 6,0749. It should be noted that the method for generating the inode numbers for the inodes is simply an example of how the inode numbers can be generated, and is not meant to be limiting in any way, as other numbering methods are possible.

FIG. 1 provides one method for converting metadata from a filesystem from the first format to the second format. It is recognized that in nonexclusive alternative embodiments, the method can include additional steps other than those specifically delineated herein or can omit certain of the steps that are specifically delineated herein. Moreover, in some embodiments, the order of the steps described below can be modified without deviating from the spirit of the present invention.

Initially, in step 100, operation of the filesystem can be stopped and a virtual snapshot of metadata that is in the first format within the filesystem, i.e., the metadata which has not yet been converted from the first format to the second format, is taken. In one embodiment, this virtual snapshot is taken at the volume level. The virtual snapshot enables the user to identify and isolate the full volume of metadata that is present within the filesystem at any given time. In this embodiment, the filesystem initially appears as including a hierarchical configuration within the filesystem that defines the relationships of data and metadata within a hierarchy of directories, subdirectories, files, etc., as explained in greater detail relative to FIG. 2. Additionally, as noted above, the metadata can include one or more inodes, one or more directory extents, one or more superblocks, one or more allocation bitmaps, etc.

In step 102, the avocation bitmaps that are present on disk are read from the disk and then written into a flat file format, or a dump directory (i.e., a directory where the flat file is maintained). During this step, the filesystem uses a feature that is designed to construct one or more "flat files" (also sometimes referred to herein as a "metadump") in a local filesystem that will ultimately be utilized to contain all of the allocation bitmaps, the inodes, the directory extents, the superblocks and/or any other type of metadata. In certain embodiments, the flat file can be a part of the filesystem that contains the metadata that is in the first format. In alternative embodiments, the flat file can be separate and distinct from the filesystem that contains the metadata that is in the first format.

As utilized herein, a flat file is essentially a long list of objects that represents the metadata that is contained in the filesystem. The objects encapsulate all of the internal structure and relationships present in the filesystem. The flat file can be read start to finish and the data contained therein used to restore the metadata to its original state in the event of a disaster. Alternatively, only a portion of the metadata can be contained within the flat file.

For example, the flat file format can provide certain advantages in situations when the filesystem, such as a RAID system in one non-exclusive embodiment, that contains all the metadata fails or is physically destroyed or otherwise prevents access to the metadata. In alternative embodiments wherein the original filesystem does not include or illustrate the various hierarchical relationships between the data and metadata, step 102 can be omitted.

In step 104, a list of inode chunks is constructed and sorted by disk location. For example, in one embodiment, the metadata is scanned to build or compile a list of inode chunks, which are then sorted based on their physical location on disk. As provided above, each inode chunk initially contains a predetermined number of inodes, such as 1,024. In certain embodiments, the inode chunks are linked from one inode chunk to the next. In such embodiments, a single block from each inode chunk can be read to successfully identify the physical location of the inode chunk and the location of the next inode chunk. The single block that is read from within the inode chunk typically encompasses one or more inodes within the inode chunk. Stated another way, this step involves reading just enough information from each inode chunk so that the physical location of the inode chunk can be identified. Further, because the inode chunks are linked sequentially, the location of the next inode chunk can be determined. Moreover, the location of the inode chunks can be identified regardless of where within the inode chunk the block that is being read is positioned.

In step 106, space is pre-allocated for new inode chunks. A determination is made as to whether there is sufficient previously unused space in the filesystem to contain the converted, i.e., reformatted, inodes. If it is determined that sufficient unused space is available in the filesystem, the necessary space is pre-allocated for the reformatted inodes. As noted above, in this embodiment, the inodes in the filesystem are allocated in contiguous 512 KB chunks, each containing 1,024 inodes of 512 bytes each. To maintain the required organization of the metadata during the metadata conversion process, the storage capacity of each inode must be increased. In the embodiment described herein, each inode is expanded to hold 1,024 bytes of information instead of the previous 512 bytes of information. If the number of inodes per chunk is increased, the size of each inode chunk must be increased. If the inode chunk size remains the same, the number of inodes per chunk must be reduced. Because inode chunks are frequently not allocated right next to one another on disk, if the inode chunk size were increased from 512 KB to 1,024 KB, fragmentation would prevent the space allocated to the existing inode chunks from being reused. Therefore, in certain embodiments, for greater efficiency of space usage and to avoid unwanted fragmentation, the inode chunk size is kept at 512 KB and the number of inodes per chunk is reduced to 512.

Accordingly, during the conversion process, the size or storage capacity of each inode chunk remains at 512 KB, but the inodes are increased to twice the size, so that each inode can store twice the previous amount of metadata. For example, in one embodiment, each inode can now store 1,024 bytes of information instead of the previous 512 bytes. Therefore, in this embodiment, with the chunk size remaining the same, and with the inode capacity for each individual inode doubling in size, each inode chunk now contains only 512 inodes instead of the previous 1,024. In alternative embodiments, the metadata conversion process can be designed wherein the inode chunk size is increased to 1,024 KB so that the inode chunk can now contain 1,024 of the inodes with increased storage capacity.

Still alternatively, in certain embodiments, during the conversion process, the size of the inodes can be increased by other than a factor of two. For example, in some embodiments, the size of the inodes can be increased so that three times or four times or some other multiple of the previous amount of metadata can be stored in each inode. Stated another way, in an embodiment wherein the size of the inodes is increased by a factor of three, each inode would be able to store three times the amount of information of the original inode, e.g., 1,536 bytes of information when each inode previously held 512 bytes of information. Somewhat similarly, in an embodiment wherein the size of the inodes is increased by a factor of four, each inode would be able to store four times the amount of information of the original inode, e.g., 2.048 bytes of information when each inode previously held 512 bytes of information.

During step 106, for each inode chunk, the allocation bitmaps are used to find a contiguous 512 KB chunk of metadata space. Moreover, because the size of each inode has increased to 1,024 bytes from the previous 512 bytes without the overall inode chunk size increasing, a first subset of the inodes in the original inode chunk can remain in the original inode chunk. Further, a second subset of the inodes in the original inode chunk will move to a new predetermined inode chunk. More particularly, in certain embodiments, the first subset of the inodes and the second subset of the inodes can include approximately the same number of inodes. In one such embodiment, the first subset of inodes and the second subset of inodes can include exactly the same number of inodes. Stated another way, during the conversion process, one half of the inodes in the original inode chunk are assigned back to the original inode chunk, and a second half of the inodes in the original inode chunk are assigned to the new predetermined inode chunk. Pre-allocating the new inode chunks allows for building of a global mapping system from old inode numbers to new inode numbers and determines whether there is enough previously unused space to complete the conversion.

In alternative embodiments, when the size of the inodes is increased by other than a factor of two, during the conversion process, one subset of inodes in the original inode chunk would be assigned back to the original inode chunk, and additional subsets of inodes would be assigned to new predetermined inode chunks. Stated another way, a new predetermined inode chunk would be used for each factor that the size of each of the inodes is increased. For example, in an alternative embodiment wherein the size of each inode is increased by a factor of three, during the conversion process, one third of the inodes in the original inode chunk would be assigned back to the original inode chunk, one third of the inodes in the original inode chunk would be assigned to a second predetermined inode chunk, and one third of the inodes in the original inode chunk would be assigned to a third predetermined inode chunk. Somewhat similarly, in an embodiment wherein the size of each inode is increased by a factor of four, during the conversion process, one fourth of the inodes in the original inode chunk would be assigned back to the original inode chunk, one fourth of the inodes in the original inode chunk would be assigned to a second predetermined inode chunk, one fourth of the inodes in the original inode chunk would be assigned to a third predetermined inode chunk, and one fourth of the inodes in the original inode chunk would be assigned to a fourth predetermined inode chunk.

In step 108, a global mapping system is constructed from the physical location of the old inode chunk to the physical location of the new inode chunk. As noted above, within the filesystem, each inode includes an inode number that is embedded in various locations throughout the metadata. The inode number encodes the physical location of the inode on disk. The global mapping system, as provided herein, tracks how to convert inode numbers in the previous, unconverted filesystem to inode numbers in the new, converted filesystem. In certain embodiments, the global mapping system can allow inode numbers to be converted without chasing or tracking on disk structures. Further, the global mapping system can allow reading, converting and writing to the metadump file in a single pass. As such, substantial time can be saved during this portion of the process by obviating additional passes through the filesystem.

In this embodiment, because each inode chunk now contains only one-half of the original number of inodes, the inode numbers must also be adjusted. In one embodiment, one-half of the inodes in the original inode chunk will remain in the original inode chunk, and the second half of the inodes in the original inode chunk will move to a new inode chunk. By way of example, an original inode chunk can include inode numbers of 1,0001 through 1,1024, where the first "1" represents the chunk number and the remaining four digits represent the specific inode within the chunk from "1" to "1024". When the size of each inode is changed (i.e., doubled in size), the inode chunk now only has space available for 512 inodes. Therefore, based on space availability, previous inodes 1,0001 through 1,0512 will still include the same inode number and will still be contained in the same inode chunk (e.g., inode number 1,0005 will remain in inode chunk "1" as inode number 1,0005). However, as sufficient space is no longer available within the old inode chunks, previous inodes 1,0513 through 1,1024 will now require a new inode number and will now be contained in a new inode chunk. If the new chunk is, for example, inode chunk "14", the inodes that were previously numbered in inode chunk "1" as 1,0513 through 1,1024 will now be numbered as 14,0001 through 14,0512, respectively. It is recognized that the foregoing numbering convention is one representative example, and other number conventions could alternatively be utilized.

For example, in one embodiment, once an inode is moved from the previous inode chunk to the new inode chunk, to determine the new inode number within that new inode chunk, 512 is subtracted from the previous inode number within the previous inode chunk. So, if the previous inode number was 1,0748, and this inode is being moved to new inode chunk "14", then the new inode number for this inode will be 14,0236, as 748 minus 512 equals 236. In another example, if the previous inode was in inode chunk "6" and had an inode number of 6,1010, and if this inode is being moved to new inode chunk "19", then the new inode number for this inode will be 19,0498, as 1010 minus 512 equals 498. In alternative embodiments, a different specific methodology can be utilized to determine what the new inode number would or should be based on the old or previous inode numbers, as long as the methodology provides a consistent manner for the new inode numbers to be determined and subsequently associated with the previous inode numbers.

In step 110, each of the inode chunks are read sequentially from disk. For each inode chunk read from disk, two 512 KB in-memory buffers are populated with converted inodes. In one embodiment, half of the converted inodes will need to be moved to new inode chunks and have new inode numbers. Thus, the global mapping system, as described in step 108, must be used to convert the embedded inode numbers for each of the inodes that will be moved to the new inode chunks. Accordingly, a reliable and organized system has been created so that related metadata within the related inodes can be easily located within the converted filesystem. Additionally, valuable time can be saved in converting the inode numbers that are embedded at various locations throughout the metadata.

As noted above, in addition to the allocation bitmaps and the regular inodes that are included within the metadata, certain metadata within the filesystem includes directory extents. Directory extents can be contained within what are referred to herein as directory inodes. As with the regular inodes, directory inodes are also contained within the inode chunks. A directory typically includes a list of names and inode numbers that are affiliated with the various files that are contained within the directory. The list of names and inode numbers is contained in directory blocks. The directory extents describe the location and length of a contiguous range of directory blocks on disk. Stated another way, the directory extents provide information that includes the location and number of directory blocks that are included within a contiguous range of directory blocks.

In step 112, the directory extents are read from the filesystem and written into a directory flat file data structure (e.g., a tree) with a separate entry being inserted into the directory flat file for each directory extent. In one embodiment, the entry can include the physical location of the directory extent on disk. In alternative embodiments, the directory extents can be written into another suitable location other than the directory flat file.

In step 114, the two converted inode chunks (for each original inode chunk as described above in step 110), along with some descriptive header information, can be written from the in-memory buffers to the metadump file.

In step 116, a sorted list of contiguous ranges of directory extents is built. After all the inode chunks have been read, converted, and stored in the metadump file, the tree of directory extent information, i.e., the information on the location and length of the contiguous range of directory blocks that was generated in step 112, is iterated and the ranges of directory extents are arranged into an orderly directory extent list so that the directory extents are listed substantially in on-disk order. In one embodiment, the directory extent list includes the directory extents being listed precisely in on-disk order. For each range, this list contains a starting disk offset (i.e., a physical location) and a length. In this embodiment, the tree of directory extents can include an important property of being easy and efficient to iterate the objects it contains (i.e., the contiguous ranges of directory extents) in a logical order.

This metadata conversion method can improve the efficiency of certain I/O operations. The use and arranging of directory extent trees as described herein helps the user in achieving this goal by making the I/O operations that are required to read and update all of the directory extents vastly more efficient by making them as sequential as possible. Two ways to optimize the I/O operations to read the directory extents within the filesystem are (i) to conduct the I/O operations in order, as is greatly enabled by building the sorted list of contiguous ranges of directory extents, and (ii) to make the I/O operations as large as possible. For example, if the tree of directory extents described the directory extents in the ranges of [7,10], [11,25], [26,50], [61,67], and [68, 100], the ranges can be effectively chunked together so that the ranges of directory extents can be illustrated as [7,50] and [61,100]. Accordingly, the tree of directory extents can be iterated by conducting two larger I/O operations instead of the five smaller I/O operations as would have otherwise been required. With this design, because directory extents tend to be rather small and somewhat randomly distributed on disk, at least a fivefold to tenfold reduction in the extent processing time can be achieved.

In step 118, each range of directory extents is read from disk into an in-memory buffer. This step continues by walking through the buffer one directory at a time from beginning to end, utilizing the sorted list of contiguous ranges of directory extents that was created in step 116. If the directory block contains directory entries, then the process continues to iterate through the directory entries. The global mapping system is utilized to make any necessary conversion of old inode numbers to new inode numbers, as described above in relation to step 108.

In step 120, the range of directory extents with converted inode numbers is written from the in-memory buffer to the metadump file.

In step 122, any required fixups, such as updates to inode numbers in the superblocks, are performed. At this point, the metadump file has been established that contains the converted filesystem data (i.e., converted inodes, converted directory extents, converted superblocks, etc.), as a result of only one full pass through the filesystem. The metadump file is well organized in that the data in the metadump file is sequential in substantially the same way that the data is sequential on disk.

In step 124, the process includes iterating sequentially through the flat, metadump file and writing its data back to the hierarchical configuration within the filesystem. At this point, all of the metadata is now contained within the filesystem in the newly converted second format. In the event that any failures occurred during step 124, such as possible process or node failures, only step 124 would need to be restarted.

In step 126, the filesystem is restarted. If for some reason the filesystem cannot be restarted, the volume snapshot created in step 100 can be used to roll-back and restore the filesystem back to its original state.

Figures 2A, 2B:
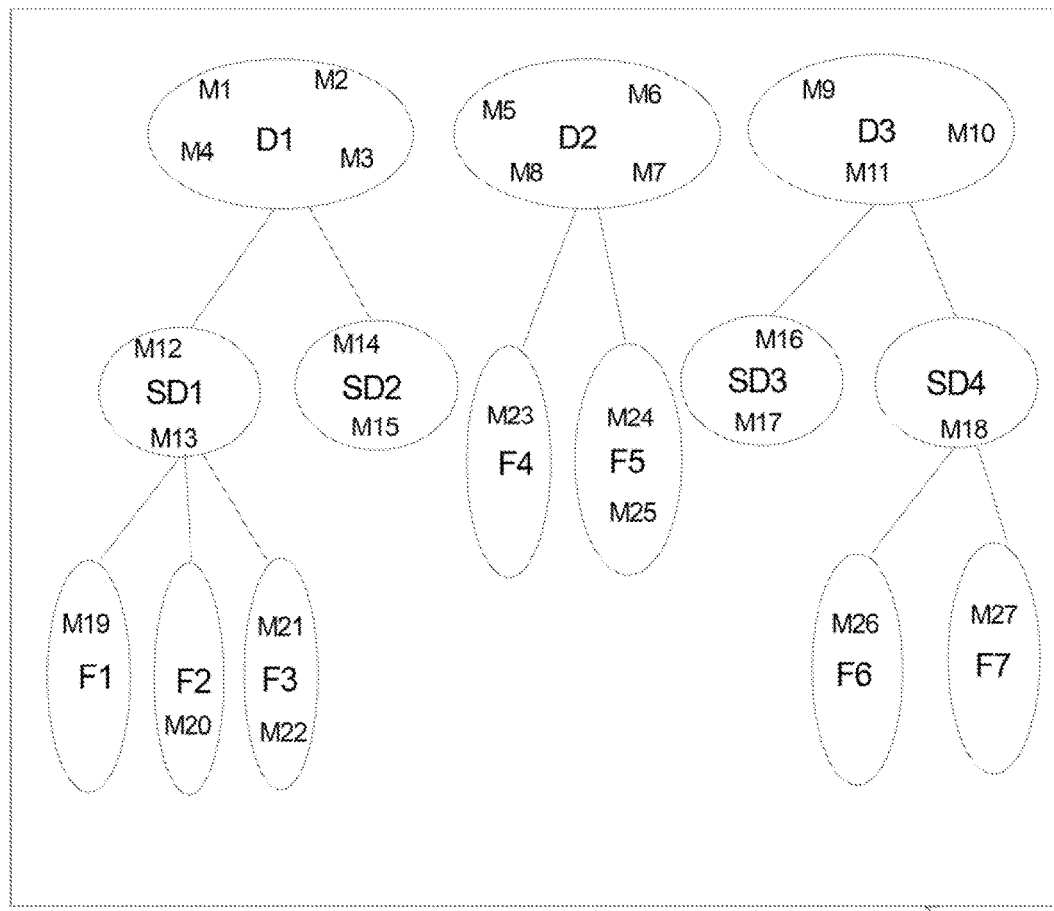
FIG. 2A is a simplified schematic diagram of one embodiment of a hierarchical configuration within a filesystem that utilizes the metadata conversion method illustrated in FIG. 1.
FIG. 2B is a simplified schematic diagram of one embodiment of a flat file that is generated to store metadata from the filesystem illustrated in FIG. 2A.

FIG. 2A is a simplified schematic diagram of one embodiment of a hierarchical configuration within a filesystem 228 that can utilize the metadata conversion method as illustrated in FIG. 1. As illustrated, the filesystem can include one or more directories (identified as D1 through D3), one or more subdirectories (identified as SD1 through SD4), and one or more files (identified as F1 through F7) that are organized in a hierarchical relationship relative to each other. Additionally, the filesystem 228 can further include a volume of metadata (identified as M1 through M27) that is contained within a plurality of inodes that are in turn organized within a plurality of inode chunks. In one embodiment, the filesystem 228 is designed so that an amount of metadata is associated with and utilized to describe the contents of each of the one or more directories, the one or more subdirectories, and/or the one or more files. The number of directories, subdirectories, files and metadata illustrated in FIG. 2A is provided for ease of discussion only and is not intended to be limiting in any manner.

FIG. 2B is a simplified schematic diagram of one embodiment of a flat file 230 that could be created from the filesystem 228 illustrated in FIG. 2A. As illustrated, the metadata is all organized in the same level regardless of whether the metadata is associated with and utilized to describe the contents of each of the one or more directories, the one or more subdirectories, and/or the one or more files.

Figure 3:
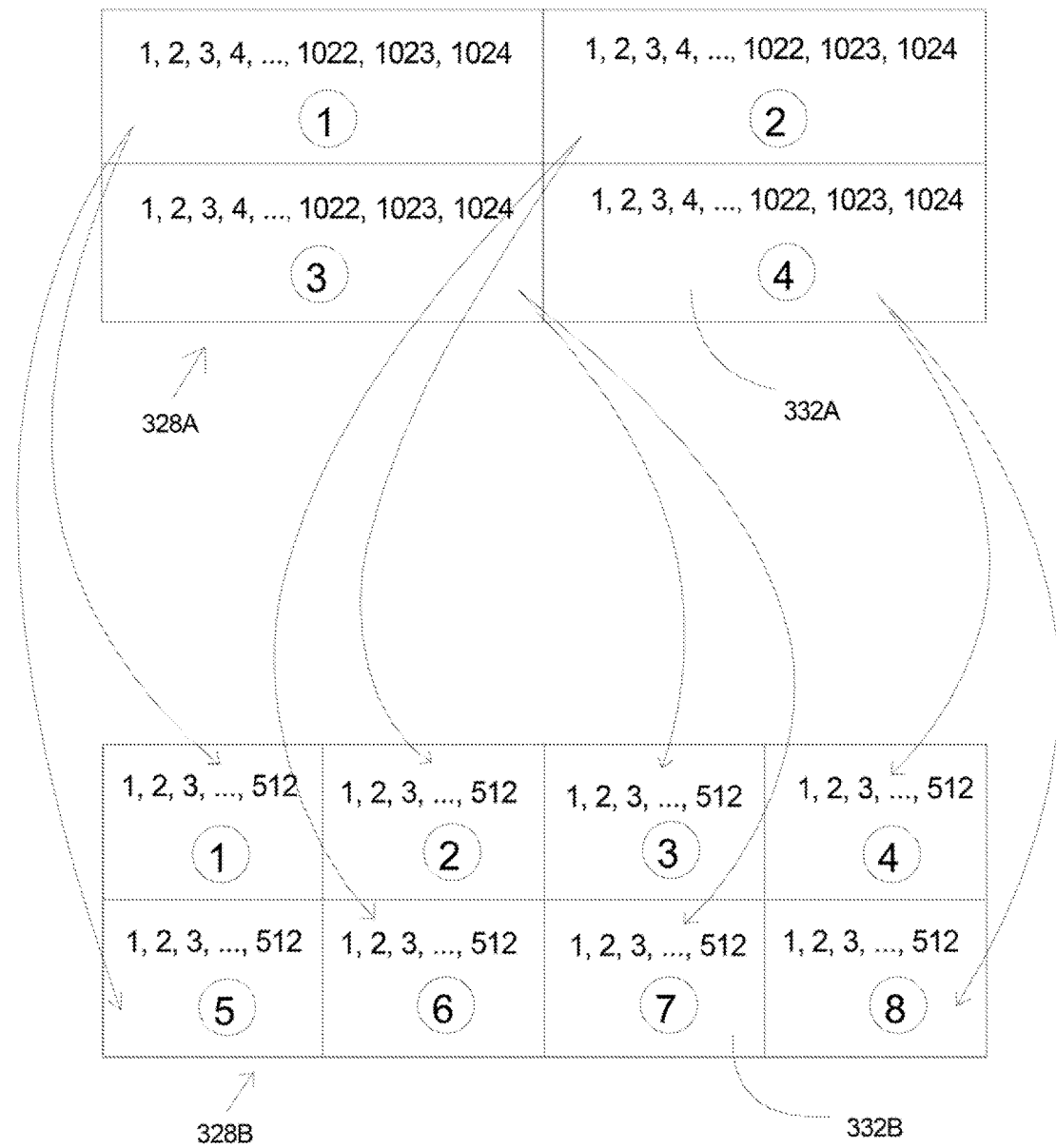
FIG. 3 is a simplified schematic diagram of one embodiment of a plurality of unconverted inode chunks in an unconverted filesystem and a plurality of converted inode chunks in a converted filesystem that utilized a method disclosed herein.

FIG. 3 is a simplified schematic diagram of one embodiment of a plurality of unconverted inode chunks 332A in an unconverted filesystem 328A and a plurality of converted inode chunks 332B in a converted filesystem 328B, wherein the conversion utilizes the method as disclosed in the present invention. In this embodiment, the unconverted filesystem 328A includes four unconverted inode chunks 332A (labeled as "1" through "4"), with each unconverted inode chunk including 1,024 inodes. Alternatively, the unconverted filesystem 328A can include more than four or less than four unconverted inode chunks 332A. Further, in this embodiment, the converted filesystem 328B includes eight converted inode chunks 332B (labeled as "1" through "8"), with each converted inode chunk 332B including 512 inodes. Alternatively, the converted filesystem 328B can include more than eight or less than eight converted inode chunks 332B.

During the conversion of the unconverted inode chunks 332A to the converted inode chunks 332B, half of the inodes that were in the first unconverted inode chunk are assigned to the first converted inode chunk, and half of the inodes in the first unconverted inode chunk are assigned to the fifth converted inode chunk. Somewhat similarly, half of the inodes that were in the second unconverted inode chunk are assigned to the second converted inode chunk, and half of the inodes in the second unconverted inode chunk are assigned to the sixth converted inode chunk. Additionally, half of the inodes that were in the third unconverted inode chunk are assigned to the third converted inode chunk, and half of the inodes in the third unconverted inode chunk are assigned to the seventh converted inode chunk. Further, half of the inodes that were in the fourth unconverted inode chunk are assigned to the fourth converted inode chunk, and half of the inodes in the fourth unconverted inode chunk are assigned to the eighth converted inode chunk.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for converting metadata in a filesystem from a first format to a second format, the method comprising the steps of:

increasing the size of each of a first inode and a second inode within a first inode chunk in the filesystem;

assigning the first inode to the first inode chunk; and assigning the second inode to a second inode chunk;
wherein the filesystem includes a hierarchical configuration, and further comprising the steps of writing the first inode chunk and the second inode chunk from the hierarchical configuration to a flat file within the filesystem, and writing the first inode chunk and the second inode chunk from the flat file back into the hierarchical configuration.

2. The method of claim 1 wherein the step of increasing includes the step of increasing the size of a plurality of inodes within the first inode chunk, and further comprising the step of assigning each of two or more subsets of the plurality of inodes to one of a plurality of inode chunks.

3. The method of claim 2 wherein the step of assigning each of two or more subsets includes an approximately equal number of inodes being contained within each subset of the plurality of inodes.

4. The method of claim 1 further comprising the step of constructing a global mapping system that relates the physical location of the first inode chunk to the physical location of the second inode chunk.

5. The method of claim 1 wherein the step of increasing includes the first inode having an original first inode number and the second inode having an original second inode number, and further comprising the steps of retaining the original first inode number for the first inode and assigning a new second inode number for the second inode.

6. A non-transitory storage medium that stores a filesystem, the filesystem including a file and metadata that describes the file, the filesystem converting the metadata from a first format to a second format utilizing the method of claim 1.

7. A method for converting metadata in a hierarchical configuration within a filesystem from a first format to a second format, the method comprising the steps of:
storing a plurality of directory extents within a first directory inode and a second directory inode in a first location within the filesystem, each directory extent identifying a physical location and a length of a contiguous range of directory blocks;
increasing the size of each of the first directory inode and the second directory inode in the first location within the filesystem;
writing the plurality of directory extents from the first location within the filesystem to a second location; and
iterating the directory extents by arranging the directory extents so that the contiguous ranges of directory blocks are listed in substantially the same order as the directory extents were listed at the first location within the filesystem.

8. The method of claim 7 further comprising the step of writing the arranged directory extent list from the hierarchical configuration into a flat file.

9. The method of claim 8 further comprising the step of writing the arranged directory extent list from the flat file back into the hierarchical configuration.

10. The method of claim 7 further comprising the steps of reading metadata that is in the first format within the hierarchical configuration; writing the metadata into a flat file; and writing the metadata back into the hierarchical configuration, the metadata being in the second format.

11. The method of claim 7 further comprising the steps of (i) increasing the size of each of a first inode and a second inode within a first inode chunk in the filesystem, (ii) assigning the first inode to the first inode chunk, and (iii) assigning the second inode to a second inode chunk.

12. The method of claim 11 further comprising the steps of writing the first inode chunk and the second inode chunk from the hierarchical configuration to a flat file, and writing the first inode chunk and the second inode chunk from the flat file back into the hierarchical configuration.

13. A non-transitory storage medium that stores a filesystem, the filesystem including a file and metadata that describes the file, the filesystem converting the metadata from a first format to a second format utilizing the method of claim 7.

\* \* \* \* \*